United States Patent
Lozano

(10) Patent No.: US 9,669,702 B2
(45) Date of Patent: Jun. 6, 2017

(54) FUEL SAVING SYSTEM

(71) Applicant: Jaime Lozano, Los Angeles, CA (US)

(72) Inventor: Jaime Lozano, Los Angeles, CA (US)

( * ) Notice: Subject to any disclaimer, the term of this patent is extended or adjusted under 35 U.S.C. 154(b) by 0 days.

(21) Appl. No.: 14/932,314

(22) Filed: Nov. 4, 2015

(65) Prior Publication Data

US 2017/0120741 A1    May 4, 2017

(51) Int. Cl.
*B60K 16/00*    (2006.01)
*B60K 8/00*    (2006.01)
*F04D 25/04*    (2006.01)
*B60K 17/04*    (2006.01)

(52) U.S. Cl.
CPC ............... *B60K 8/00* (2013.01); *B60K 17/04* (2013.01); *F04D 25/045* (2013.01); *B60Y 2200/14* (2013.01)

(58) Field of Classification Search
CPC .... B60K 8/00; B60K 16/00; B60K 2016/006; B60L 8/00
See application file for complete search history.

(56) References Cited

U.S. PATENT DOCUMENTS

| | | | |
|---|---|---|---|
| 2,047,155 A * | 7/1936 | Rettman | B60K 16/00 180/2.2 |
| 4,043,126 A | 8/1977 | Santos | |
| 4,123,910 A | 11/1978 | Ellison, Sr. | |
| 4,132,282 A * | 1/1979 | Sparks | B60K 16/00 180/2.2 |
| 5,847,470 A | 12/1998 | Mitchell | |
| 6,497,593 B1 * | 12/2002 | Willis | B60K 16/00 440/8 |
| 6,838,782 B2 * | 1/2005 | Vu | B60K 6/48 290/44 |
| 7,215,037 B2 * | 5/2007 | Scalzi | B60K 16/00 290/44 |
| 7,271,555 B1 | 9/2007 | Ciccone | |
| 7,997,371 B2 * | 8/2011 | Khymych | B60K 16/00 180/165 |
| 8,072,091 B2 * | 12/2011 | Wilson | F03B 11/02 290/44 |
| 8,177,479 B2 * | 5/2012 | Watts | B60K 16/00 415/184 |
| 8,240,416 B2 | 8/2012 | Cong | |
| 8,371,401 B1 * | 2/2013 | Illustrato | B60K 16/00 180/2.2 |
| 8,997,907 B2 * | 4/2015 | Rode | B60K 11/085 180/68.1 |
| 2006/0171805 A1 * | 8/2006 | Allaire | B60K 16/00 416/55 |
| 2008/0169133 A1 | 7/2008 | Tomoyasu | |
| 2009/0288902 A1 * | 11/2009 | Adli | B60K 3/00 180/302 |

(Continued)

*Primary Examiner* — Brian Swenson

(57) ABSTRACT

A fuel saving system includes a vehicle. A housing is coupled to the vehicle and the housing captures air when the vehicle is driven. A baffling unit is coupled to the housing and the baffling unit selectively inhibits the air from entering the housing. A turbo is rotatably positioned within the housing and the turbo is rotated by the air passing through the housing. Thus, the turbo produces rotational torque. A drive is coupled between the vehicle and the turbo. The drive transfers the rotational torque to the vehicle thereby increasing a fuel efficiency of the vehicle when the vehicle is driven.

14 Claims, 6 Drawing Sheets

(56) References Cited

U.S. PATENT DOCUMENTS

| | | | | |
|---|---|---|---|---|
| 2013/0038066 A1* | 2/2013 | Diaz | ................. | F03D 9/00 |
| | | | | 290/55 |
| 2013/0043082 A1* | 2/2013 | Tran | ................. | B60K 16/00 |
| | | | | 180/2.2 |
| 2013/0324339 A1* | 12/2013 | Kato | ................. | F16H 7/18 |
| | | | | 474/137 |

* cited by examiner

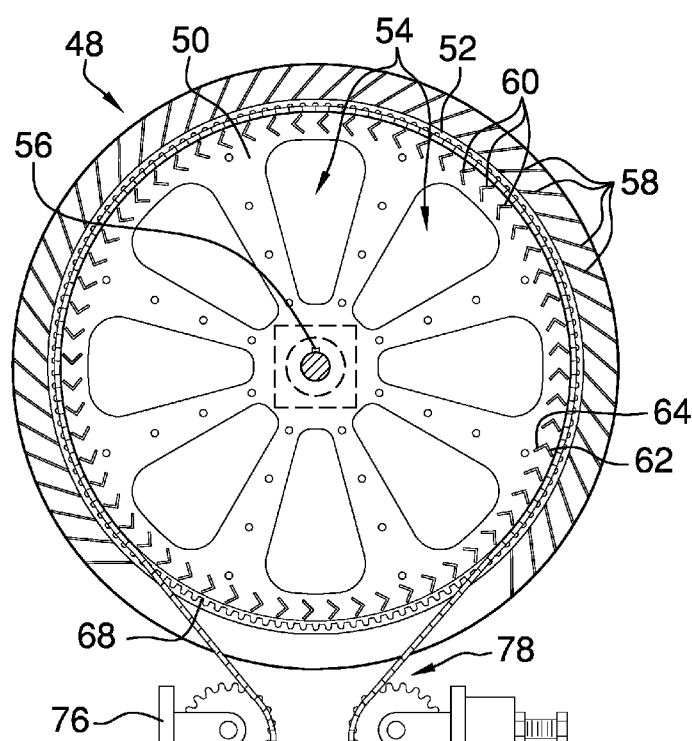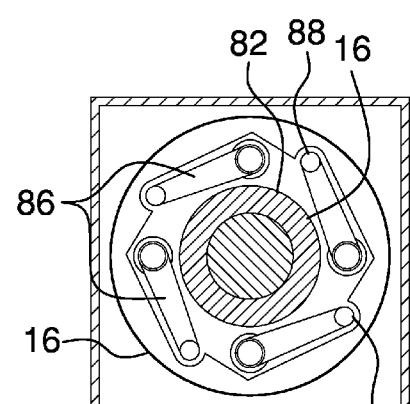
FIG. 6
FIG. 7

FUEL SAVING SYSTEM

BACKGROUND OF THE DISCLOSURE

Field of the Disclosure

The disclosure relates to fuel saving devices and more particularly pertains to a new fuel saving device for increasing a fuel efficiency of a vehicle when the vehicle travels at highway speeds.

SUMMARY OF THE DISCLOSURE

An embodiment of the disclosure meets the needs presented above by generally comprising a vehicle. A housing is coupled to the vehicle and the housing captures air when the vehicle is driven. A baffling unit is coupled to the housing and the baffling unit selectively inhibits the air from entering the housing. A turbo is rotatably positioned within the housing and the turbo is rotated by the air passing through the housing. Thus, the turbo produces rotational torque. A drive is coupled between the vehicle and the turbo. The drive transfers the rotational torque to the vehicle thereby increasing a fuel efficiency of the vehicle when the vehicle is driven.

There has thus been outlined, rather broadly, the more important features of the disclosure in order that the detailed description thereof that follows may be better understood, and in order that the present contribution to the art may be better appreciated. There are additional features of the disclosure that will be described hereinafter and which will form the subject matter of the claims appended hereto.

The objects of the disclosure, along with the various features of novelty which characterize the disclosure, are pointed out with particularity in the claims annexed to and forming a part of this disclosure.

BRIEF DESCRIPTION OF THE DRAWINGS

The disclosure will be better understood and objects other than those set forth above will become apparent when consideration is given to the following detailed description thereof. Such description makes reference to the annexed drawings wherein:

FIG. 6 is a cross sectional view taken along line 6-6 of FIG. 5 of an embodiment of the disclosure.

FIG. 7 is a cross sectional view taken along line 7-7 of FIG. 5 of an embodiment of the disclosure.

DESCRIPTION OF THE PREFERRED EMBODIMENT

Figure 1:
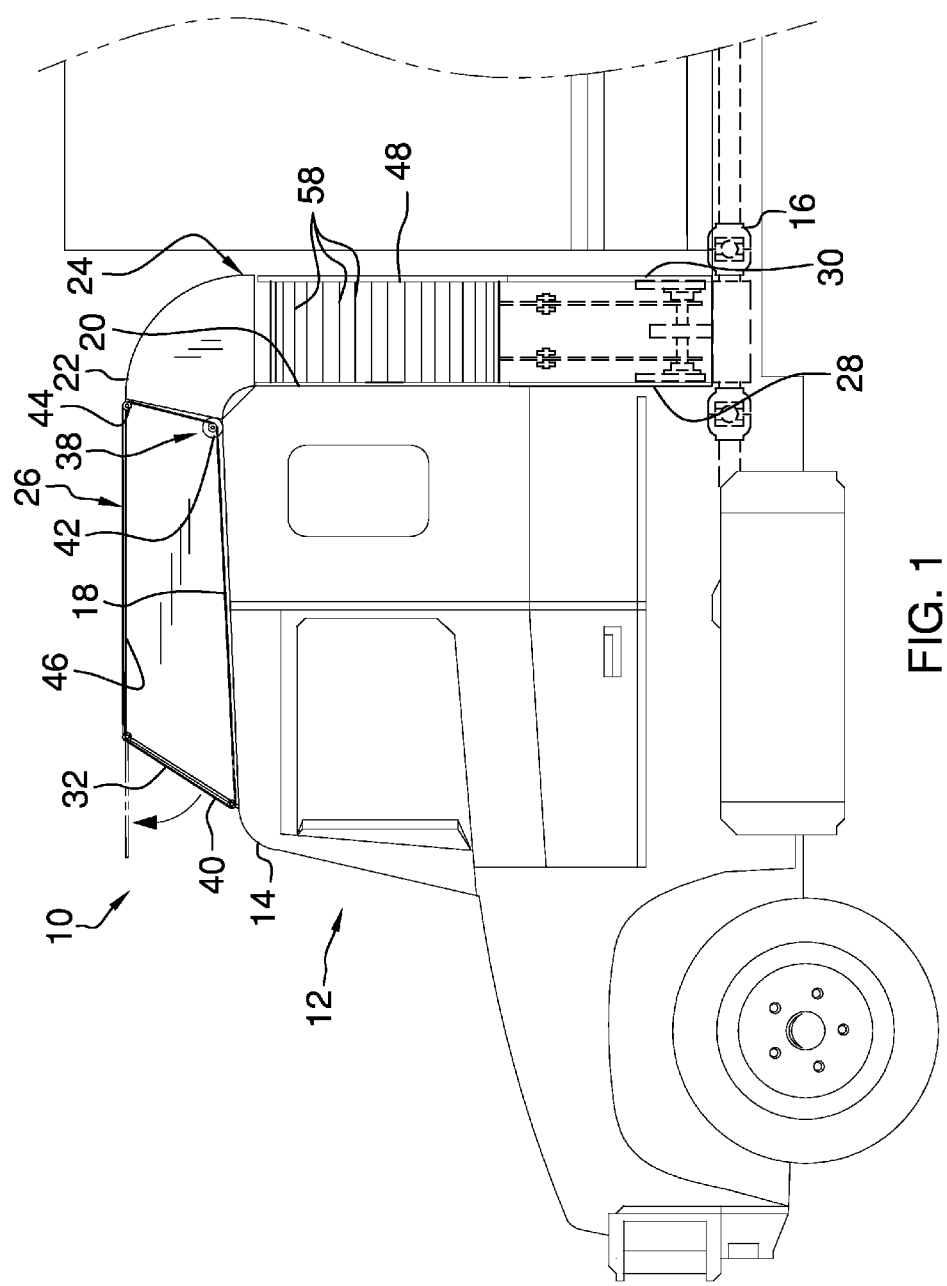
FIG. 1 is a left side phantom view of a fuel saving system according to an embodiment of the disclosure.
Figure 2:
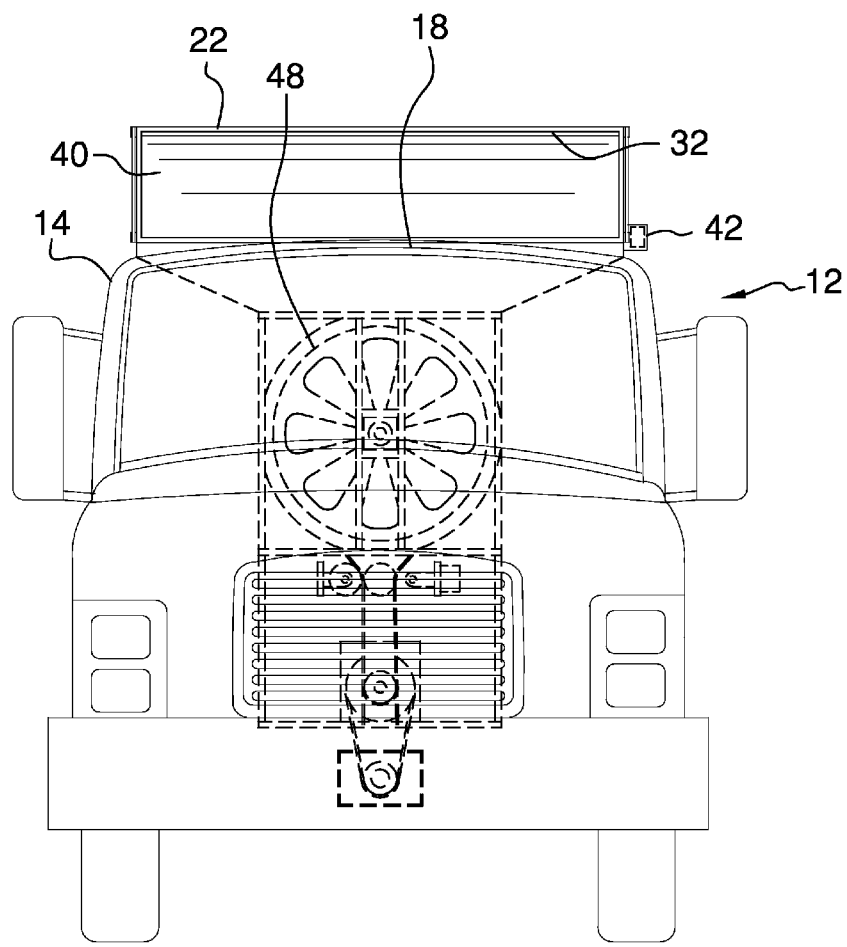
FIG. 2 is a front phantom view of an embodiment of the disclosure.

With reference now to the drawings, and in particular to FIGS. 1 through 7 thereof, a new fuel saving device embodying the principles and concepts of an embodiment of the disclosure and generally designated by the reference numeral 10 will be described.

As best illustrated in FIGS. 1 through 7, the fuel saving system 10 generally comprises a vehicle 12 that has a cab 14 and a drive shaft 16. The cab 14 has a top side 18 and a back side 20. The vehicle 12 may comprise a semi tractor or the like. A housing 22 is coupled to the vehicle 12 and the housing 22 captures air when the vehicle 12 is driven. The housing 22 may have a rear portion 24 and a top portion 26. The rear portion 24 may extend upwardly along the back side 20 and the top portion 26 may extend forwardly along the top side 18.

Figure 3:
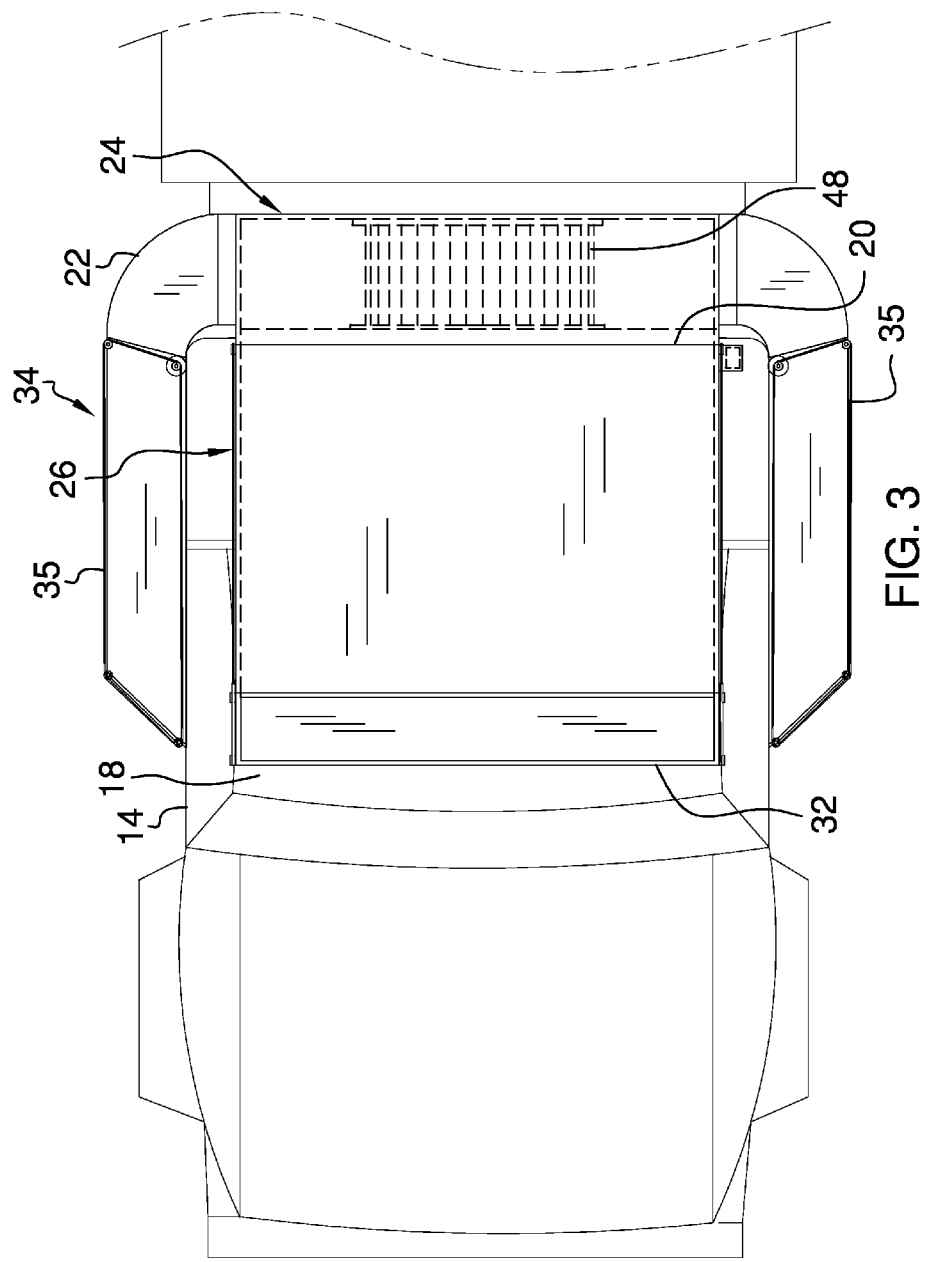
FIG. 3 is a top view of an alternative embodiment of the disclosure.
Figure 4:
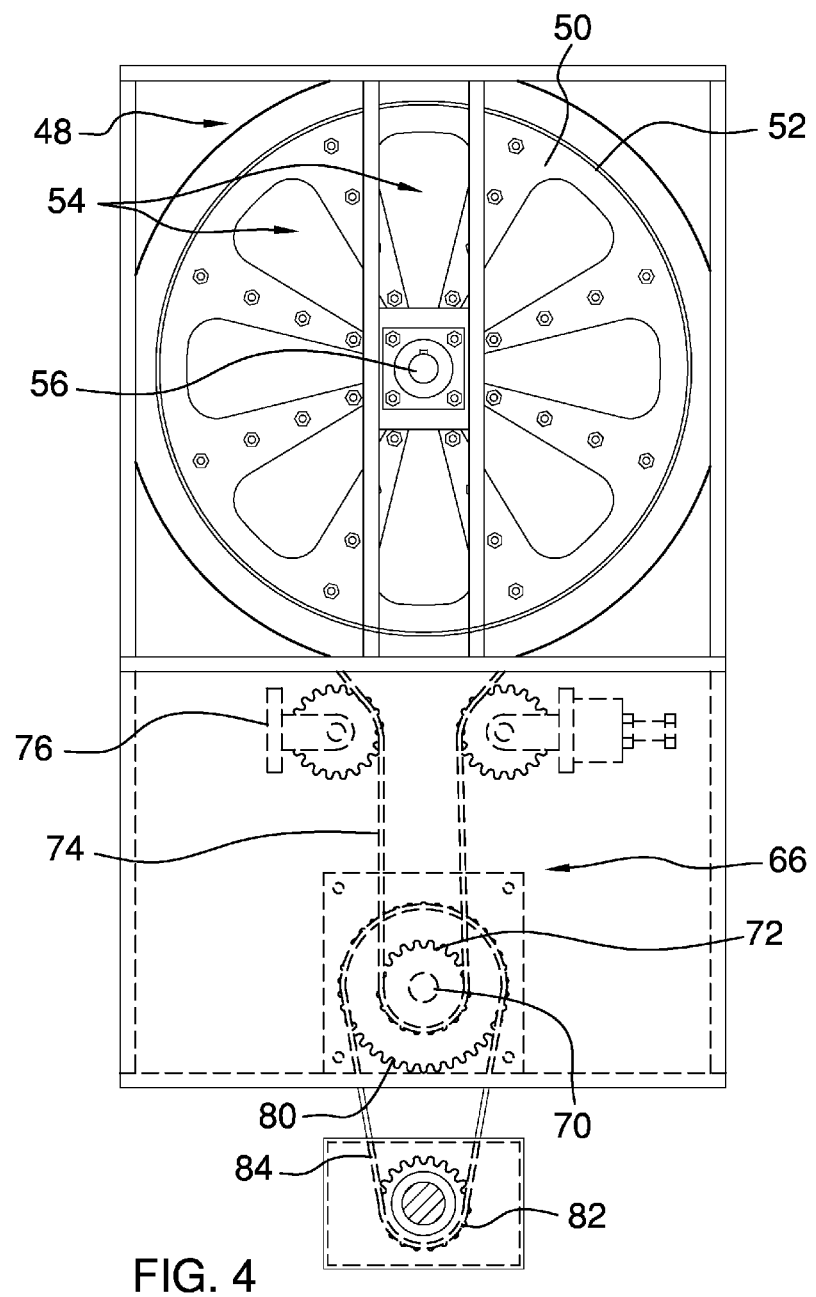
FIG. 4 is a front view of an embodiment of the disclosure.
Figure 5:
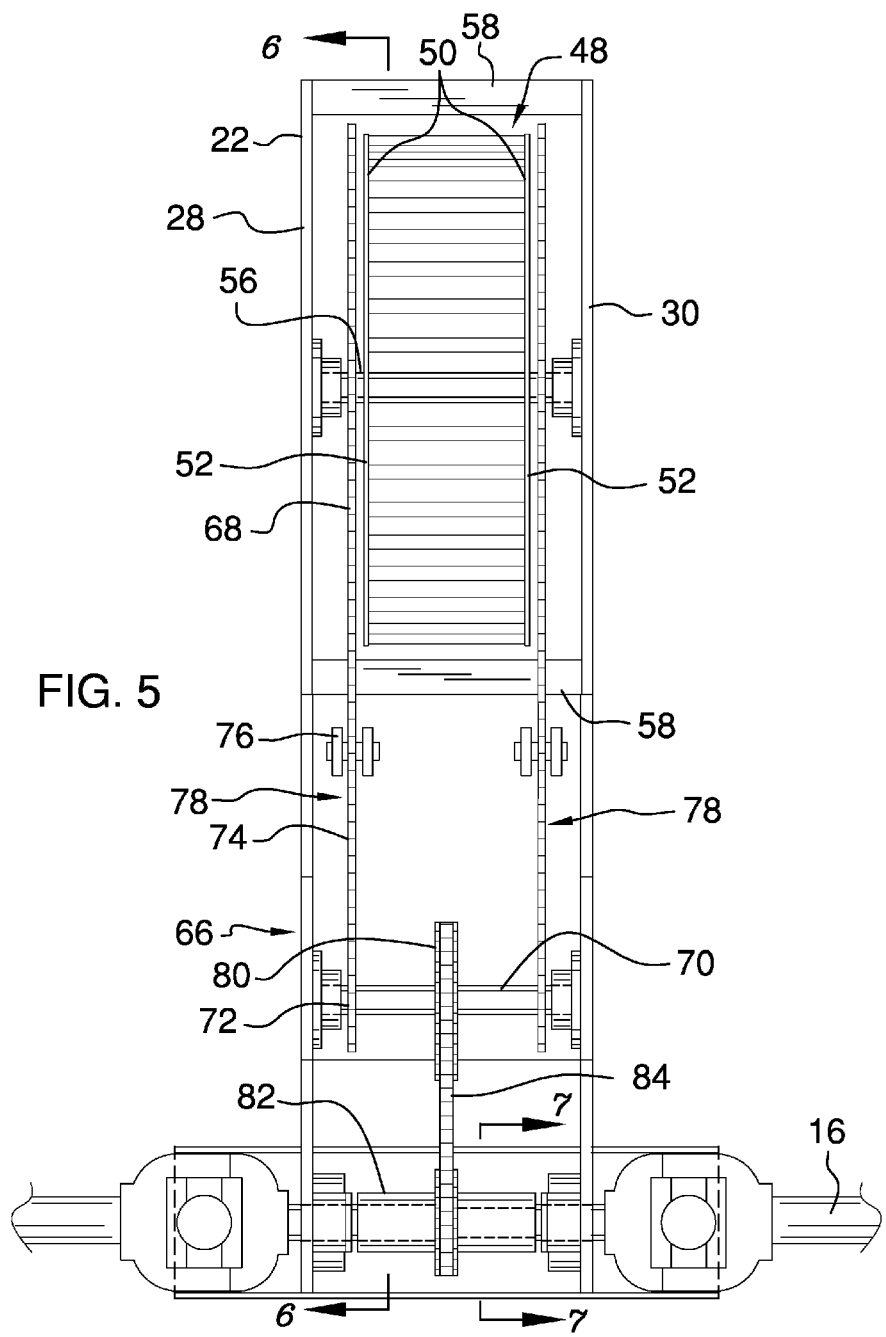
FIG. 5 is a left side view of an embodiment of the disclosure.

The housing 22 has a front wall 28, a back wall 30 and a forward end 32. The forward end 32 is open and the forward end 32 is positioned on the top side 18. Thus, the forward end 32 captures the air when the vehicle 12 is driven. In an alternative embodiment 34 as shown in FIG. 3, the housing 22 may include pair of trunks 35. Each of the trunks 35 may extend laterally along each of a pair of lateral walls 36 of the cab 14. Each of the trunks 35 captures the air when the vehicle 12 is driven.

A baffling unit 38 is coupled to the housing 22 such that the baffling unit 38 selectively inhibits the air from entering the housing 22. The baffling unit 38 comprises a door 40 that is hingedly coupled to the housing 22. The door 40 is positionable in an open position and a closed position. The door 40 is positioned on the forward end 32 such that the door 40 selectively covers and exposes the forward end 32.

A motor 42 is coupled to the housing 22 and the motor 42 is electrically coupled to the vehicle 12. The motor 42 may comprise an electric motor or the like. A pulley 44 is rotatably coupled to the housing 22. A cable 46 is coupled between the motor 42 and the door 40 and the cable 46 extends around the pulley 44. Thus, the motor 42 selectively urges the door 40 into the open position and the closed position.

A turbo 48 is rotatably positioned within the housing 22. The turbo 48 is rotated by the air passing through the housing 22. Thus, the turbo 48 produce a rotational torque. The turbo 48 comprises a pair of disks 50. The disks 50 are spaced apart from each other and each of the disks 50 has an outer edge 52. Each of the disks 50 may have a plurality of holes 54 extending therethrough. The holes 54 in each of the disks 50 are spaced apart from each other and radiate outwardly from a center of each of the disks 50.

A first shaft 56 extends through each of the disks 50. The first shaft 56 rotatably engages the housing 22 such that the turbo 48 is rotatably suspended within the housing 22. The turbo 48 is positioned behind the cab 14 and the turbo 48 may be positioned within the rear portion 24 of the housing 22. The first shaft 56 is centrally positioned in each of the disks 50 and the first shaft 56 is horizontally oriented.

A plurality of air guides 58 is provided. Each of the air guides 58 is coupled to and extends between the front wall 28 and the back wall 30 of the housing 22. Each of the air guides 58 is spaced apart from each other and distributed around the outer edge 52 of each of the disks 50. Each of the air guides 58 lies on a plane that is angled with respect to a radius of each of the disks 50. Thus, each of the air guides 58 directs the air to flow toward the first shaft 56 when the vehicle 12 is driven.

A plurality of vanes 60 is provided and each of the vanes 60 is coupled to and extends between the disks 50. The vanes 60 are spaced apart from each other and distributed around the disks 50. Each of the vanes 60 is positioned closer to the air guides 58 than the first shaft 56. Thus, each of the vanes 60 is frictionally engaged by the air directed by the air guides 58 when the vehicle 12 is driven.

Each of the vanes 60 has a first portion 62 forming an angle with respect to a second portion 64 such that each of the vanes 60 forms a channel. Thus, each of the vanes 60 captures the air thereby facilitating the air to rotate the turbo 48 when the vehicle 12 is driven. The vanes 60 may comprise turbo vanes of any conventional design.

A drive 66 is coupled between the vehicle 12 and the turbo 48. The drive 66 transfers the rotational torque to the vehicle 12. Thus, a fuel efficiency of the vehicle 12 may be increased when the vehicle 12 is driven. The drive 66 comprises a primary gear 68 that has the first shaft 56 extending therethrough. The primary gear 68 is spaced from an associated one of the disks 50.

A second shaft 70 is rotatably coupled to the housing 22 and the second shaft 70 is positioned beneath the turbo 48. The second shaft 70 is horizontally oriented. A first gear 72 has the second shaft 70 extending therethrough. The first gear 72 is aligned with the primary gear 68.

A first chain 74 is coupled between the primary gear 68 and the first gear 72. Thus, the turbo 48 rotates the second shaft 70 when the vehicle 12 is driven. The first chain 74 extends downwardly between associated ones of the air guides 58. A tensioner 76 is coupled to the housing 22. The tensioner 76 engages the first chain 74 between the primary gear 68 and the first gear 72 such that the tensioner 76 adjusts slack in the first chain 74. Thus, the first chain 74 is inhibited from frictionally engaging the associated air guides 58. The tensioner 76 may comprise a pair of idler pulleys or the like and each of the idler pulleys may positioned on opposite sides of the first chain 74.

The primary gear 68, the first gear 72, the first chain 74 and the tensioner 76 comprise a first half 78 of the drive 66. The first half 78 may be one of a pair of first halves 78. Each of the first halves 78 may be positioned between the turbo 48 and an associated one of the front wall 28 and the back wall 30.

A second gear 80 is provided and the second shaft 70 extends through the second gear 80. The second gear 80 is centrally positioned on the second shaft 70. The second gear 80 has a diameter that is greater than a diameter of the first gear 72. A clutch 82 is rotatably coupled to the driveshaft 16 and the clutch 82 is aligned with the second gear 80.

A second chain 84 is coupled between the second gear 80 and the clutch 82. Thus, the turbo 48 rotates the clutch 82. The clutch 82 frictionally engages the driveshaft 16 when the turbo 48 reaches a trigger rotational speed. Thus, the clutch 82 transfers the rotational torque to the driveshaft 16. The trigger rotational speed may be a speed at which the driveshaft 16 is rotating. The second gear 80 increases a rotational speed between the first chain 74 and the second chain 84.

The clutch 82 may comprise a centrifugal clutch or the like. The clutch 82 may have a plurality of arms 86 that are each rotatably coupled to the clutch 82. Each of the arms 86 may have a free end 88. The free end 88 of the arms 86 may be urged outwardly from the clutch 82 through centrifugal force when the clutch 82 is rotated. Thus, the free end 88 of the arms 86 may frictionally engage the driveshaft 16 thereby transferring the rotational torque between the clutch 82 and the driveshaft 16.

In use, the motor 42 is actuated to urge the door 40 into the open position. The vehicle 12 is driven and the forward end 32 of the housing 22 captures the air. The air guides direct the air to flow toward the first shaft 70. The air frictionally engages the vanes 60 and the turbo 48 rotates. The rotational speed of the turbo 48 is directly proportional to a velocity of the vehicle 12. Thus, the rotational torque produced by the turbo 48 is directly proportional to the velocity of the vehicle 12. The rotational torque produced by the turbo 48 is transferred into the clutch 82. The clutch 82 frictionally engages the driveshaft 16 when the turbo 48 reaches the trigger rotational speed. Thus, the fuel economy of the vehicle 12 is increased when the vehicle 12 is travelling at highway speeds.

With respect to the above description then, it is to be realized that the optimum dimensional relationships for the parts of an embodiment enabled by the disclosure, to include variations in size, materials, shape, form, function and manner of operation, system and use, are deemed readily apparent and obvious to one skilled in the art, and all equivalent relationships to those illustrated in the drawings and described in the specification are intended to be encompassed by an embodiment of the disclosure.

Therefore, the foregoing is considered as illustrative only of the principles of the disclosure. Further, since numerous modifications and changes will readily occur to those skilled in the art, it is not desired to limit the disclosure to the exact construction and operation shown and described, and accordingly, all suitable modifications and equivalents may be resorted to, falling within the scope of the disclosure. In this patent document, the word "comprising" is used in its non-limiting sense to mean that items following the word are included, but items not specifically mentioned are not excluded. A reference to an element by the indefinite article "a" does not exclude the possibility that more than one of the element is present, unless the context clearly requires that there be only one of the elements.

I claim:

1. A fuel saving system comprising:
   a vehicle, said vehicle having a cab;
   a housing being coupled to said vehicle wherein said housing is configured to capture air when said vehicle is driven;
   a baffling unit being coupled to said housing such that said baffling unit selectively inhibits the air from entering said housing;
   a turbo being rotatably positioned within said housing wherein said turbo is configured to be rotated by the air passing through said housing thereby facilitating said turbo to produce a rotational torque, said turbo comprising
      a pair of disks, said disks being spaced apart from each other, each of said disks having an outer edge, and
      a first shaft extending through each of said disks, said first shaft rotatably engaging said housing such that said turbo is rotatably suspended within said housing having said turbo being positioned behind said cab, said first shaft being centrally positioned in each of said disks, said first shaft being horizontally oriented; and
   a drive being coupled between said vehicle and said turbo wherein said drive is configured to transfer the rotational torque to said vehicle thereby increasing a fuel efficiency of said vehicle when said vehicle is driven.

2. The system according to claim 1, wherein:
   said vehicle has a cab and a drive shaft, said cab having a top side and a back side; and
   said housing extends upwardly along said back side and forwardly along said top side, said housing having front wall, a back wall and a forward end, said forward end being open, said forward end being positioned on said top side wherein said forward end is configured to capture the air when said vehicle is driven.

3. The system according to claim 2, wherein said baffling unit comprises a door being hingedly coupled to said housing, said door being positionable in an open position and a closed position, said door being positioned on said forward end such that said door selectively covers and exposes said forward end.

4. The system according to claim 3, further comprising:
a motor being coupled to said housing, said motor being electrically coupled to said vehicle;
a pulley being rotatably coupled to said housing; and
a cable being coupled between said motor and said door wherein said motor selectively urges said door into said open position and said closed position, said cable extending around said pulley.

5. The system according to claim 1, further comprising:
said housing having a front wall and a back wall; and
a plurality of air guides, each of said air guides being coupled to and extending between each of said disks, each of said air guides being spaced apart from each other and distributed around said outer edge of each of said disks, each of said air guides lying on a plane being angled with respect to a radius of each of said disks wherein each of said air guides is configured to direct the air to flow toward said first shaft when said vehicle is driven.

6. The system according to claim 5, further comprising a plurality of vanes, each of said vanes being coupled to and extending between said disks, said vanes being spaced apart from each other and distributed around said disks, each of said vanes being positioned closer to said air guides than said first shaft wherein each of said vanes is configured to be frictionally engaged by the air directed by said air guides when said vehicle is driven.

7. The system according to claim 6, wherein each of said vanes has a first portion forming an angle with respect to a second portion such that each of said vanes forms a channel wherein each of said vanes is configured to capture the air thereby facilitating the air to rotate said turbo when said vehicle is driven.

8. The system according to claim 1, wherein:
said turbo includes a pair of disks; and
said drive comprises
a primary gear having said first shaft extending therethrough such that said primary gear is spaced from an associated one of said disks, and
a second shaft being rotatably coupled to said housing, said second shaft being positioned beneath said turbo, said second shaft being horizontally oriented.

9. The system according to claim 8, further comprising:
a first gear having said second shaft extending therethrough, said first gear being aligned with said primary gear; and
a first chain being coupled between said primary gear and said first gear such that said turbo rotates said second shaft when said vehicle is driven.

10. The system according to claim 9, further comprising a tensioner being coupled to said housing, said tensioner engaging said chain between said primary gear and said first gear such that said tensioner adjusts slack in said first chain.

11. The system according to claim 9, further comprising a second gear having said second shaft extending therethrough, said second gear being centrally positioned on said second shaft, said second gear having a diameter being greater than a diameter of said first gear.

12. A fuel saving system comprising:
a vehicle;
a housing being coupled to said vehicle wherein said housing is configured to capture air when said vehicle is driven;
a baffling unit being coupled to said housing such that said baffling unit selectively inhibits the air from entering said housing;
a turbo being rotatably positioned within said housing wherein said turbo is configured to be rotated by the air passing through said housing thereby facilitating said turbo to produce a rotational torque, said turbo including a pair of disks;
a drive being coupled between said vehicle and said turbo wherein said drive is configured to transfer the rotational torque to said vehicle thereby increasing a fuel efficiency of said vehicle when said vehicle is driven, said drive comprising
a primary gear having said first shaft extending therethrough such that said primary gear is spaced from an associated one of said disks, and
a second shaft being rotatably coupled to said housing, said second shaft being positioned beneath said turbo, said second shaft being horizontally oriented;
a first gear having said second shaft extending therethrough, said first gear being aligned with said primary gear;
a first chain being coupled between said primary gear and said first gear such that said turbo rotates said second shaft when said vehicle is driven;
a second gear having said second shaft extending therethrough, said second gear being centrally positioned on said second shaft, said second gear having a diameter being greater than a diameter of said first gear; and
a clutch being rotatably coupled to a driveshaft, said clutch being aligned with said second gear.

13. The system according to claim 12, further comprising a second chain being coupled between said second gear and said clutch such that said turbo rotates said clutch, said clutch frictionally engaging said driveshaft when said turbo reaches a trigger rotational speed wherein said clutch is configured to transfer the rotational torque to said driveshaft.

14. A fuel saving system comprising:
a vehicle having a cab and a drive shaft, said cab having a top side and a back side;
a housing being coupled to said vehicle wherein said housing is configured to capture air when said vehicle is driven, said housing extending upwardly along said back side and forwardly along said top side, said housing having a front wall, a back wall and a forward end, said forward end being open, said forward end being positioned on said top side wherein said forward end is configured to capture the air when said vehicle is driven;
a baffling unit being coupled to said housing such that said baffling unit selectively inhibits the air from entering said housing, said baffling unit comprising:
a door being hingedly coupled to said housing, said door being positionable in an open position and a closed position, said door being positioned on said forward end such that said door selectively covers and exposes said forward end,
a motor being coupled to said housing, said motor being electrically coupled to said vehicle,
a pulley being rotatably coupled to said housing, and
a cable being coupled between said motor and said door wherein said motor selectively urges said door into said open position and said closed position, said cable extending around said pulley;

a turbo being rotatably positioned within said housing wherein said turbo is configured to be rotated by the air passing through said housing thereby facilitating said turbo to produce a rotational torque, said turbo comprising:
- a pair of disks, said disks being spaced apart from each other, each of said disks having an outer edge,
- a first shaft extending through each of said disks, said first shaft rotatably engaging said housing such that said turbo is rotatably suspended within said housing having said turbo being positioned behind said cab, said first shaft being centrally positioned in each of said disks, said first shaft being horizontally oriented,
- a plurality of air guides, each of said air guides being coupled to and extending between said front wall and said back wall of said housing, each of said air guides being spaced apart from each other and distributed around said outer edge of each of said disks, each of said air guides lying on a plane being angled with respect to a radius of each of said disks wherein each of said air guides is configured to direct the air to flow toward said first shaft when said vehicle is driven, and
- a plurality of vanes, each of said vanes being coupled to and extending between said disks, said vanes being spaced apart from each other and distributed around said disks, each of said vanes being positioned closer to said air guides than said first shaft wherein each of said vanes is configured to be frictionally engaged by the air directed by said air guides when said vehicle is driven, each of said vanes having a first portion forming an angle with respect to a second portion such that each of said vanes forms a channel wherein each of said vanes is configured to capture the air thereby facilitating the air to rotate said turbo when said vehicle is driven; and a drive being coupled between said vehicle and said turbo wherein said drive is configured to transfer the rotational torque to said vehicle thereby increasing a fuel efficiency of said vehicle when said vehicle is driven, said drive comprising:
- a primary gear having said first shaft extending therethrough such that said primary gear is spaced from an associated one of said disks,
- a second shaft being rotatably coupled to said housing, said second shaft being positioned beneath said turbo, said second shaft being horizontally oriented,
- a first gear having said second shaft extending therethrough, said first gear being aligned with said primary gear,
- a first chain being coupled between said primary gear and said first gear such that said turbo rotates said second shaft when said vehicle is driven,
- a tensioner coupled to said housing, said tensioner engaging said chain between said primary gear and said first gear such that said tensioner adjusts slack in said first chain,
- a second gear having said second shaft extending therethrough, said second gear being centrally positioned on said second shaft, said second gear having a diameter being greater than a diameter of said first gear,
- a clutch being rotatably coupled to said driveshaft, said clutch being aligned with said second gear, and
- a second chain being coupled between said second gear and said clutch such that said turbo rotates said clutch, said clutch frictionally engaging said driveshaft when said turbo reaches a trigger rotational speed wherein said clutch is configured to transfer the rotational torque to said driveshaft.

* * * * *